April 22, 1930. O. VON KORIES 1,755,828
AEROPLANE
Filed Jan. 7, 1929
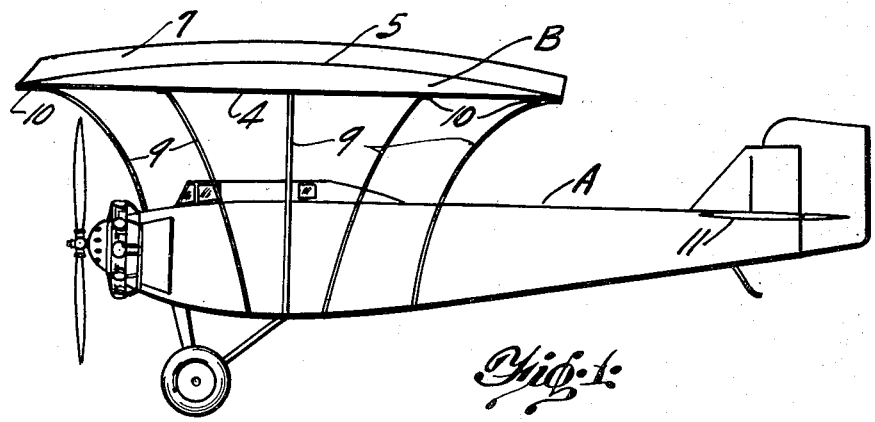
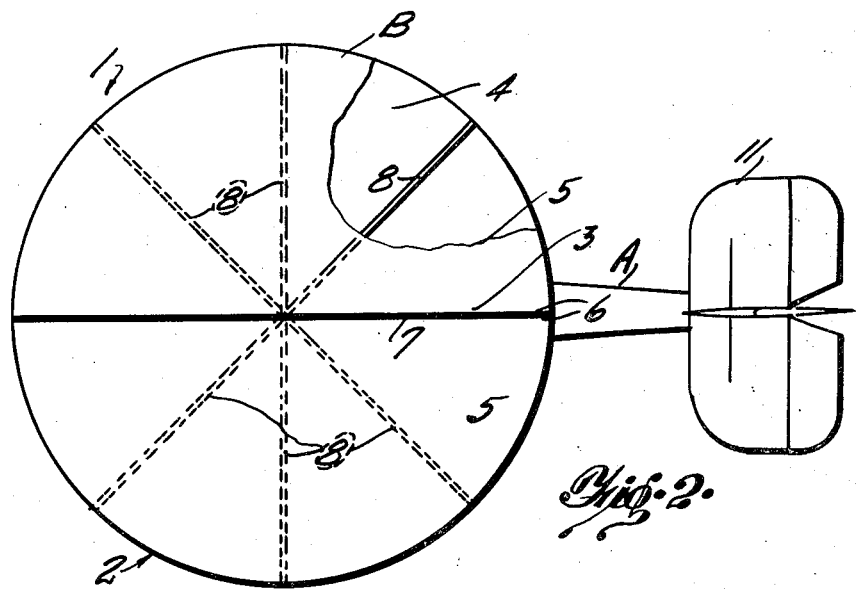
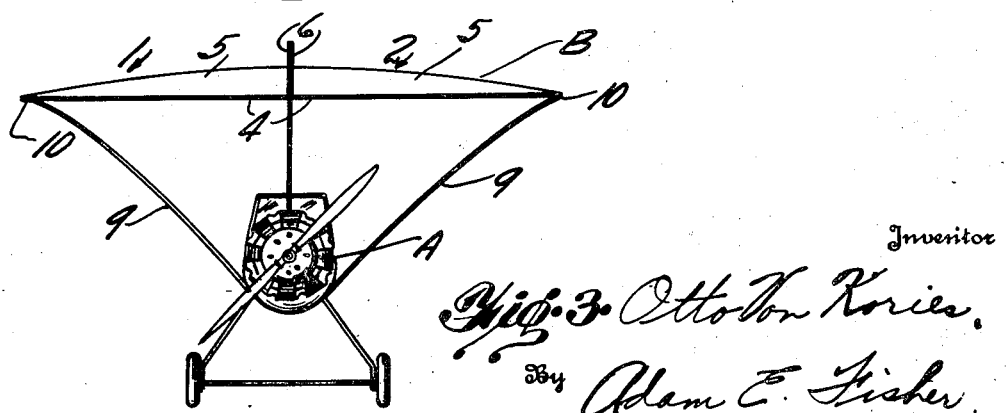

Patented Apr. 22, 1930

1,755,828

UNITED STATES PATENT OFFICE

OTTO VON KORIES, OF HOLTVILLE, CALIFORNIA

AEROPLANE

Application filed January 7, 1929. Serial No. 330,885.

This invention relates to aeroplanes and more particularly to improvements in the supporting planes or wings therefor.

The main object of the invention is to provide a plane the use of which will increase the speed, stability in flight and weight carrying ability of an aeroplane as well as making for greater ease and safety in the operation thereof.

Another object is to provide a plane or wing assembly for an aeroplane which will materially decrease the lateral dimensions of the machine thus facilitating the storage and handling of the same.

A further object is to provide a plane or wing assembly of the foregoing characteristics which may be conveniently applied to the fuselages of aeroplanes now in use.

The foregoing and other objects as will appear hereinafter, together with means whereby the same may be carried into effect will best be understood from the following description of one possible embodiment of the invention, taken in connection with the accompanying drawing in which:

Figure 1 is a side view of an aeroplane with which is associated my improved plane or wing structure.

Figure 2 is a plan view thereof, and

Figure 3 is a front view thereof.

Referring now more particularly to the drawing the reference character A denotes the conventional fuselage of an aeroplane and B my improved wing structure. As shown in Figure 2 the wing B is substantially circular in plan and is composed of two semi-circular sections 1 and 2 joined together at their inwardly disposed straight edges as denoted generally at 3 with the meeting line disposed longitudinally with respect to the fuselage A. The sections 1 and 2 comprise the flat semi-circular lower plates 4 of aluminum or other metal of low specific gravity joined together in any suitable manner and the upper outwardly convexed semicircular plates 5 also of aluminum and secured along their semicircular margins to the margins of the lower plates 4. The meeting edges of the upper convexed plates 4 are provided with angles or flanges 6 disposed perpendicularly to the said plates 5 and joined together to form the vertical keel 7 extending diametrically across the wing as shown. Ribs or bulk heads 8 are secured radially within the wing to aid in supporting the convexed upper plates 5 as will be understood.

The wing B is secured above the fuselage A by arcuate struts 9 secured at 10 to the margins of the lower side of the wing and connected at their other ends to the fuselage in any suitable manner, it being understood that a plane coinciding with and extended rearwardly from the lower surface of the wing will be parallel with the rear stabilizer 11 upon the fuselage. The wing is also positioned correctly with respect to the center of gravity and to the remainder of the aeroplane.

The utility and advantages of this improved wing structure as hereinbefore set forth will be apparent to those skilled in the art to which it appertains. Since the wing is circular and therefore the ratio of width to length is much greater than is true with the customary wing the center of pressure will be evenly distributed over a relatively larger surface. Also due to the fact that the wing presents a curved leading edge to the air the point of pressure will be eliminated to a great extent. These factors make the aeroplane more stable in flight and facilitates the actions of taking off and landing. The keel 7 stabilizes the plane laterally and reduces the drift and also reduces the tendency of the aeroplane to skid when making a turn as will be understood.

While I have herein set forth a certain preferred embodiment of my invention it is understood that I may vary from the same in minor structural details so as best to construct a practical device for the purposes intended, not departing from the spirit of the invention and within the scope of the appended claims.

I claim:

1. In a device of the character described, a wing comprising semicircular lower plates joined together edge to edge and semicircular convexed upper plates joined together edge to edge above the said lower plates and secured thereto, ribs radially extended from the center of the wing between the upper and lower plates and angle strips secured to the meeting edges of the upper wings to form a keel.

2. In a device of the character described, a circular wing comprising two semicircular sections joined together and an upwardly extended keel formed along the junction of the two sections.

3. In a wing structure for an aeroplane, a hollow, circular wing, the lower surface thereof being flat and the upper surface being cambered, and a keel mounted perpendicularly upon the outer side of the upper surface of the structure.

In testimony whereof I affix my signature.

OTTO VON KORIES.